No. 738,609. Patented September 8, 1903.

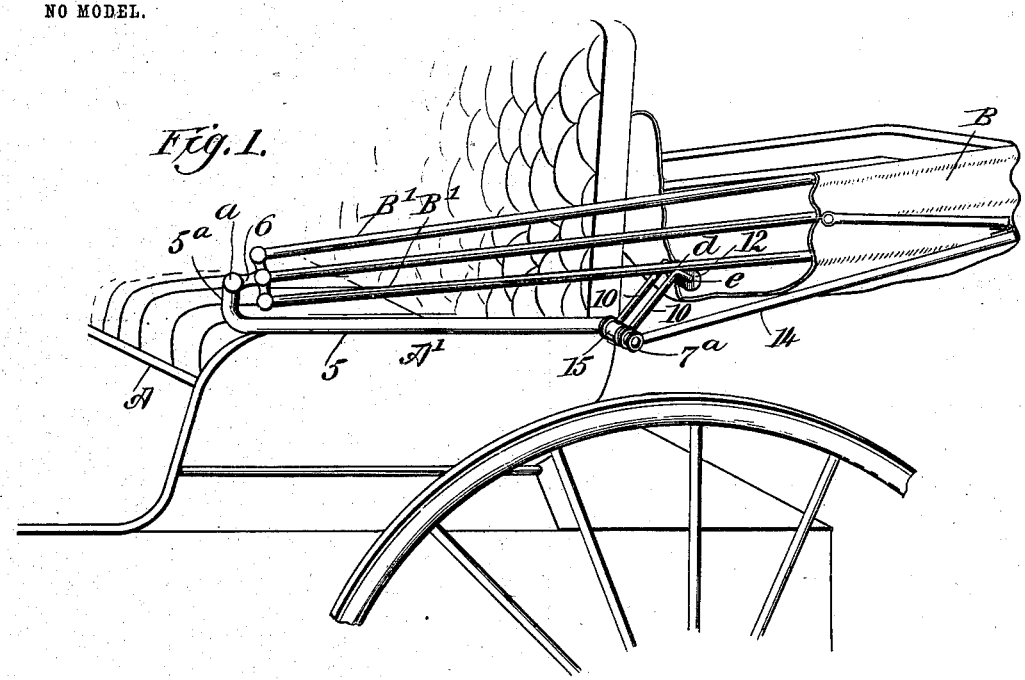
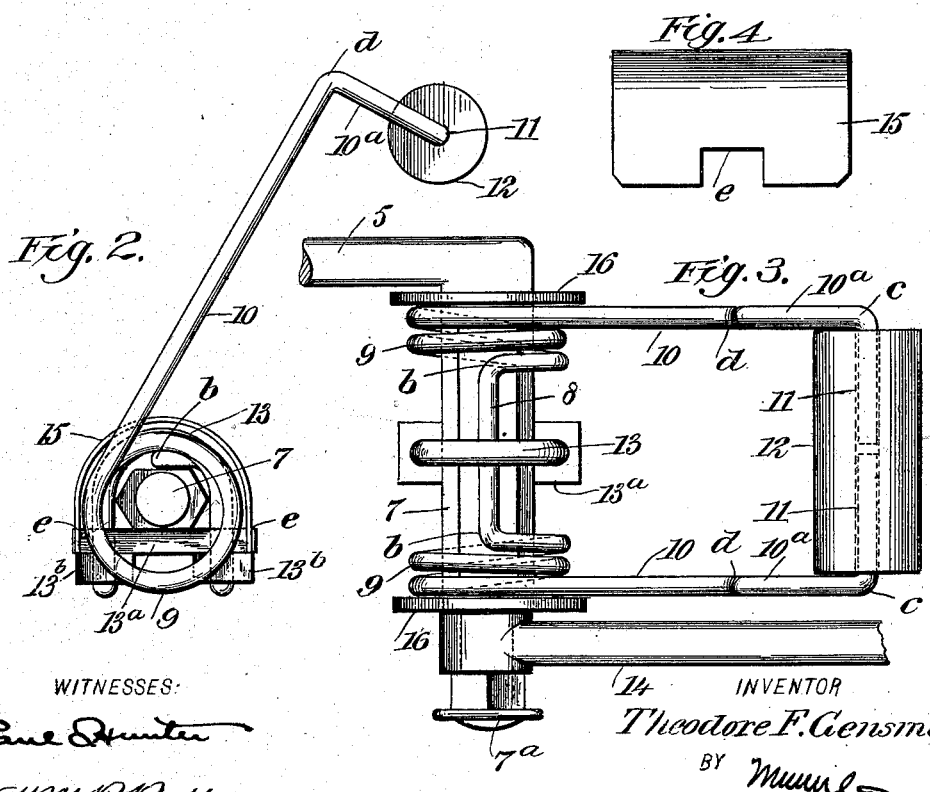

UNITED STATES PATENT OFFICE.

THEODORE FERDINAND GENSMER, OF LEWISTON, MINNESOTA.

RESILIENT REST FOR VEHICLE-TOPS.

SPECIFICATION forming part of Letters Patent No. 738,609, dated September 8, 1903.

Application filed April 2, 1903. Serial No. 150,743. (No model.)

*To all whom it may concern:*

Be it known that I, THEODORE FERDINAND GENSMER, a citizen of the United States, and a resident of Lewiston, in the county of Winona and State of Minnesota, have invented a new Improved Resilient Rest for Vehicle-Tops, of which the following is a full, clear, and exact description.

This invention has for its object to provide a novel simple rest for the support of a reclining vehicle-top and which is adapted to absorb jar incidental to the sudden descent of the top when it is rocked into a reclining position to remove the top from above the seat of the vehicle.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of a portion of a vehicle and of a folding top therefor, showing the improvement applied for the support of the reclining vehicle-top. Fig. 2 is an enlarged side view of the improvement held upon an arm that projects from the side of a vehicle-seat. Fig. 3 is a plan view of the improved vehicle-top rest, and Fig. 4 is a detached side view of a spring-cover employed.

In the drawings that represent the construction and application of the invention, A represents the seat of a vehicle, and B a folding top thereon. Upon an upwardly-extended portion A' of the vehicle that forms an end wall for the seat A a side rail 5 is secured, which forms a guard for the end of the seat, and the forward end thereof which is usually bent upwardly, as at $5^a$, affords support for the lower ends of the bows B' of the vehicle-top B, these bows being pivoted at their ends upon the T-shaped heel-iron 6, the depending member of which is pivoted upon the upturned arm $5^a$ on the side rail 5, as indicated at $a$ in Fig. 1.

It will be understood that while the brief description given is for one side of the vehicle-body, one end of the seat thereon, and the bow ends at said side of the vehicle, said parts are of course duplicated at the opposite side thereof, and as the parts of the vehicle are not features of the invention such as are shown and described, are sufficient to make clear the application and operation of the improvement.

Upon an outwardly-projected arm 7, positioned at or near the rear end of the side rail 5 and which is provided with flat parallel upper and lower sides for a portion of its length, as indicated in Figs. 2 and 3, a spring-coil that is a feature of the invention is held, said coil and coacting details being constructed, essentially, as follows: At a suitable distance from the center of the length of a resilient wire rod two right-angular bends $b$ are formed thereon, thereby extending like portions of said wire rod at the same side from the ends of the central bar 8 and spaced apart by said central straight bar. Similar spring-coils 9 are formed by bending the portions of the wire rod that are extensions from the bends $b$. A suitable number of turns are given to each spring-coil 9, and from the outer coil of each spring resilient arms 10 of equal length are extended in the same direction parallel with each other. Right-angular bends $c$ are formed at an equal distance from the extremities of the wire rod, thus forming two similar trunnions 11, that are projected toward each other in the same plane. Preferably at an equal distance from the bends $c$ a right-angle bend $d$ is formed on each resilient arm 10, thus providing two similar depending members $10^a$ at the outer ends of the arms 10, and upon the trunnions 11 a roller 12 of any suitable material is mounted to revolve.

In arranging the device for service, it being understood that it is provided in duplicate, one for each side of the vehicle, the straight bar 8 between the spring-coils 9 is mounted upon the upper surface of the horizontal arm 7 and clamped thereon by the looped clip-bolt 13 and clamping-plate $13^a$, through which threaded ends of the spaced members of the clip-bolt project for the reception of the nuts $13^b$, that by adjustment bind the clamping-plate on the lower side of the arm and secure the bar 8 thereon. It will be seen that the "set" of the resilient arms 10 is such that they project upward and rearward from the arm 7 and adapt the spring-coils 9 to support the roller 12 in the path of the bows B' when the latter are folded and lowered.

Upon the threaded outer end portion of the lateral arm 7 a cap-nut 7ª is mounted, which serves to retain in place the perforated lower end of a member 14 of the usual prop-braces employed to hold the vehicle-top elevated, which enables said members 14 at each side of the vehicle to rock on the arms 7.

A spring-cover 15, preferably formed of sheet metal, is provided to incase the top and sides of the spring-coils 9, said cover being arched, so as to nearly contact with the spring-coils when in position over them. In the lower edges of the cover 15 opposite rectangular notches e are formed, which receive the projecting end portions of the clamping-plate 13ª, the frictional contact of the side edges of said notches with the side edges of the clamping-plate serving to hold the cover in place.

Upon the arm 7 near its junction with the side rail 5 a washer 16, of leather or other suitable material, is mounted, which is positioned near the said side rail, and a like washer is mounted upon the end portion of the arm 7 near the spring-coil 9 and is held in place by the member 14 of the top prop-brace. The cover 15 rests against the circular edges of the washers 16, that afford end walls for the completion of a casing around the coiled springs 9.

In use it will be seen that the jar caused by quickly dropping the vehicle-top rearwardly will be effectively cushioned by the yielding of the spring-supported roller 12, whereon the lowermost bow B' of the folded set impinges, and as a similarly-constructed cushioning device is provided at each side of the vehicle-top to be engaged by the members of said bow it will be seen that the shock of impact will be absorbed by the springs 9 and arms 10, thus avoiding the liability of bending or breaking the bows.

The rollers 12 prevent injury to the bows B', that at times rest thereon, as longitudinal movement due to slight rocking of the vehicle-top when folded will be permitted without abrasion of the surface of the engaged portions of the bow.

Having thus described my invention, I claim as new and desire to secure by Letters Patent—

1. The combination with a vehicle-seat, a side rail thereon having a lateral arm near the rear end thereof, and a foldable vehicle-top held to rock upon the forward portion of said side rail, of a spring-cushion device comprising two spring-coils formed integral with an intervening spacing-bar, said bar being clamped upon the lateral arm, a spring-arm projected from the outer turn on each spring-coil, each of said arms having a lateral trunnion member on the outer end, a roller loosely mounted upon the said lateral members, and a casing over the spring-coils, the roller being adapted to receive and cushion the impact of the vehicle-top when folded and rocked downward.

2. A spring-cushion device for vehicles, comprising two spring-coils formed integral with an intervening spacing-bar, a spring-arm projected from the outer turn on each spring-coil, each of said arms having a lateral trunnion on the outer end, a roller loosely mounted upon the said lateral trunnions, and a casing over the spring-coils, the roller being adapted to receive and cushion the impact of the vehicle-top when folded and rocked downward.

3. A spring-cushion device, comprising two spring-coils formed integral with an intervening spacing-bar, a spring-arm projected from the outer turn on each spring-coil, each of said arms having a lateral trunnion on the outer end, and a roller loosely mounted upon the said lateral members.

4. The combination with a vehicle having a lateral arm projecting therefrom, of a spring-cushion device comprising two spring-coils formed integral with an intervening spacing-bar, said lateral arm having a portion of its periphery flattened, said spacing-bar being clamped upon said flattened portion of the arm, a spring-arm projected from the outer turn on each spring-coil, each of said arms having a lateral trunnion member on its outer end, and a roller loosely mounted upon said arm, as set forth.

In testimony whereof I have signed my name to this specification in the presence of two subscribing witnesses.

THEODORE FERDINAND GENSMER.

Witnesses:
JOHN GENSMER,
ROBERT MATZKE.